United States Patent
Murooka

(10) Patent No.: US 10,094,224 B2
(45) Date of Patent: Oct. 9, 2018

(54) ROTOR BLADE AND FAN

(71) Applicant: IHI Corporation, Koto-ku (JP)

(72) Inventor: Takeshi Murooka, Tokyo (JP)

(73) Assignee: IHI Corporation, Koto-ku (JP)

(*) Notice: Subject to any disclaimer, the term of this patent is extended or adjusted under 35 U.S.C. 154(b) by 731 days.

(21) Appl. No.: 14/465,484

(22) Filed: Aug. 21, 2014

(65) Prior Publication Data

US 2014/0363304 A1 Dec. 11, 2014

Related U.S. Application Data

(63) Continuation of application No. PCT/JP2013/061837, filed on Apr. 23, 2013.

(30) Foreign Application Priority Data

May 1, 2012 (JP) ................................ 2012-104433

(51) Int. Cl.
  *F01D 5/14* (2006.01)
  *B32B 5/12* (2006.01)
  (Continued)

(52) U.S. Cl.
  CPC ............... *F01D 5/147* (2013.01); *B32B 5/12* (2013.01); *F01D 5/282* (2013.01); *F04D 19/002* (2013.01);
  (Continued)

(58) Field of Classification Search
  CPC . F01D 5/147; F01D 5/282; F01D 5/34; F01D 5/14; F01D 5/12; F04D 29/38; F04D 29/388
  See application file for complete search history.

(56) References Cited

U.S. PATENT DOCUMENTS 4,022,547 A * 5/1977 Stanley .................. F01D 5/282
  416/230
5,375,978 A 12/1994 Evans et al.
(Continued)

FOREIGN PATENT DOCUMENTS

CN 102037247 A 4/2011
JP 52-53399 A 4/1977
(Continued)

OTHER PUBLICATIONS

International Search Report dated Aug. 6, 2013 for PCT/JP2013/061837 filed on Apr. 23, 2013 with English Translation.
(Continued)

*Primary Examiner* — Woody Lee, Jr.
*Assistant Examiner* — Cameron Corday
(74) *Attorney, Agent, or Firm* — Oblon, McClelland, Maier & Neustadt, L.L.P.

(57) ABSTRACT

A rotor blade main body includes multiple first composite sheet groups and multiple second composite sheet groups which are provided in a blade thickness direction. Each first composite sheet group includes multiple composite sheets which are stacked one on another from a blade thickness center side toward a dorsal surface. Each second composite sheet group includes multiple composite sheets which are stacked one on another from the blade thickness center side toward a ventral surface. A composite direction of orientation directions of fibers in the multiple composite sheets in each of the sheet groups inclines by 20 degrees to 45 degrees from a span direction.

6 Claims, 8 Drawing Sheets

(51) Int. Cl.

| | |
|---|---|
| *F01D 5/28* | (2006.01) |
| *F04D 29/02* | (2006.01) |
| *F04D 29/32* | (2006.01) |
| *F04D 19/00* | (2006.01) |
| *F04D 29/38* | (2006.01) |

(52) U.S. Cl.
CPC ......... *F04D 29/023* (2013.01); *F04D 29/324* (2013.01); *F04D 29/388* (2013.01); *B32B 2260/023* (2013.01); *B32B 2603/00* (2013.01); *F05D 2300/6034* (2013.01); *Y02T 50/672* (2013.01)

(56) References Cited

U.S. PATENT DOCUMENTS

| | | | |
|---|---|---|---|
| 5,785,498 | A | 7/1998 | Quinn et al. |
| 6,290,895 | B1 | 9/2001 | Wang et al. |
| 2005/0053466 | A1 | 3/2005 | Finn et al. |
| 2006/0222837 | A1* | 10/2006 | Kismarton ............ B29C 70/083 428/297.4 |
| 2006/0243860 | A1 | 11/2006 | Kismarton |
| 2013/0111908 | A1 | 5/2013 | Murooka et al. |

FOREIGN PATENT DOCUMENTS

| | | |
|---|---|---|
| JP | 2003-254298 A | 9/2003 |
| JP | 2005-113908 A | 4/2005 |
| JP | 2010-203435 A | 9/2010 |
| JP | 4666719 B2 | 4/2011 |
| RU | 81 275 U1 | 3/2009 |
| RU | 2 384 750 C1 | 3/2010 |
| SU | 1 827 982 A1 | 5/1995 |
| WO | WO2009/119830 A1 | 10/2009 |
| WO | WO 2012/008452 A1 | 1/2012 |

OTHER PUBLICATIONS

International Written Opinion dated Aug. 6, 2013 for PCT/JP2013/061837 filed on Apr. 23, 2013.

Combined Office Action and Search Report dated Dec. 17, 2015 in Russian Patent Application No. 2014147567/06(076479) (with English language translation).

Combined Chinese Office Action and Search Report dated Nov. 13, 2015 in Patent Application No. 201380012794.7 (with English Translation).

Extended European Search Report dated Nov. 4, 2015 in Patent Application No. 13785070.7.

Office Action dated Jan. 5, 2016 in Japanese Patent Application No. 2012-104433 (with unedited computer generated English translation).

* cited by examiner

FF ←          → FR

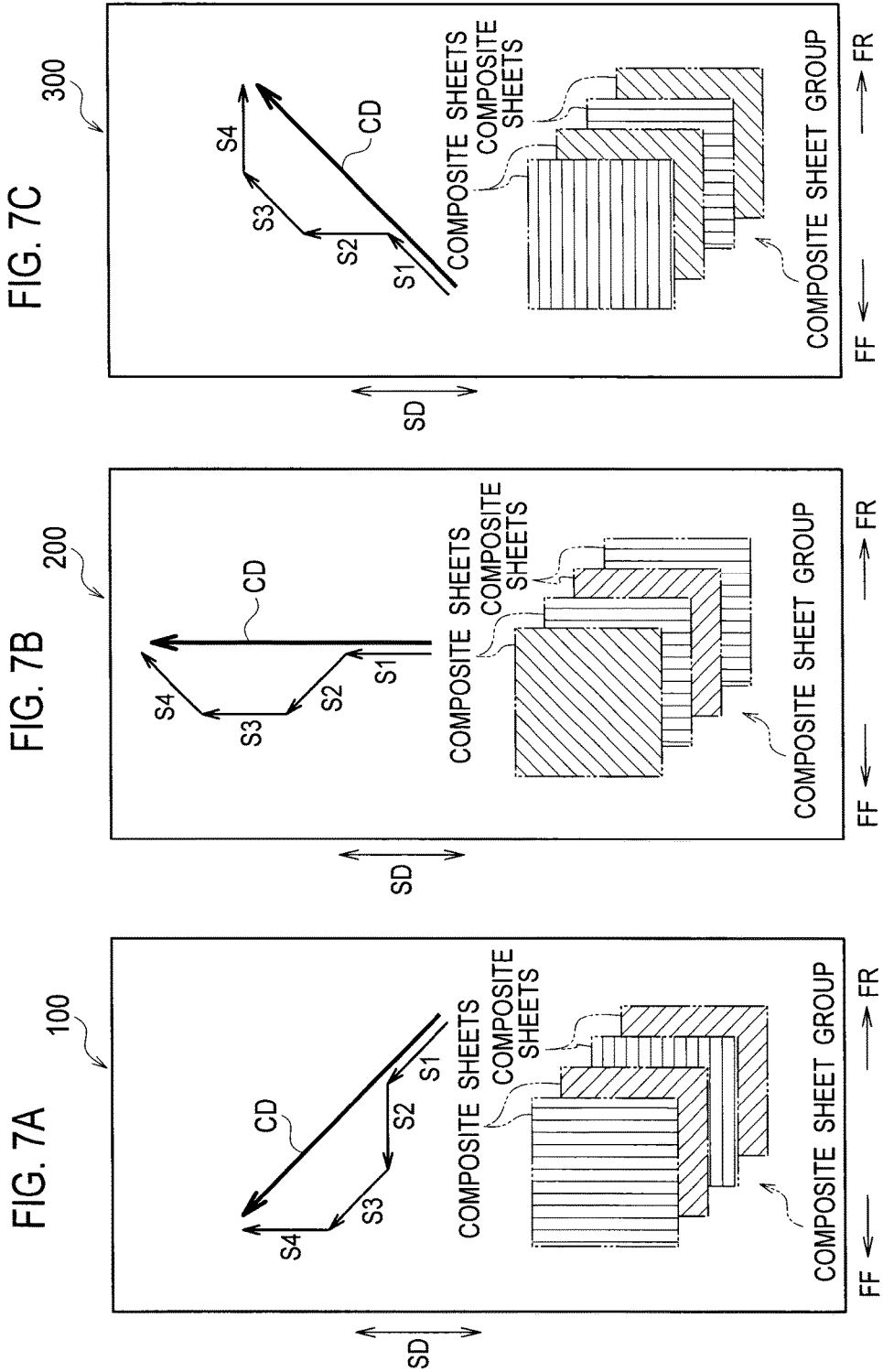

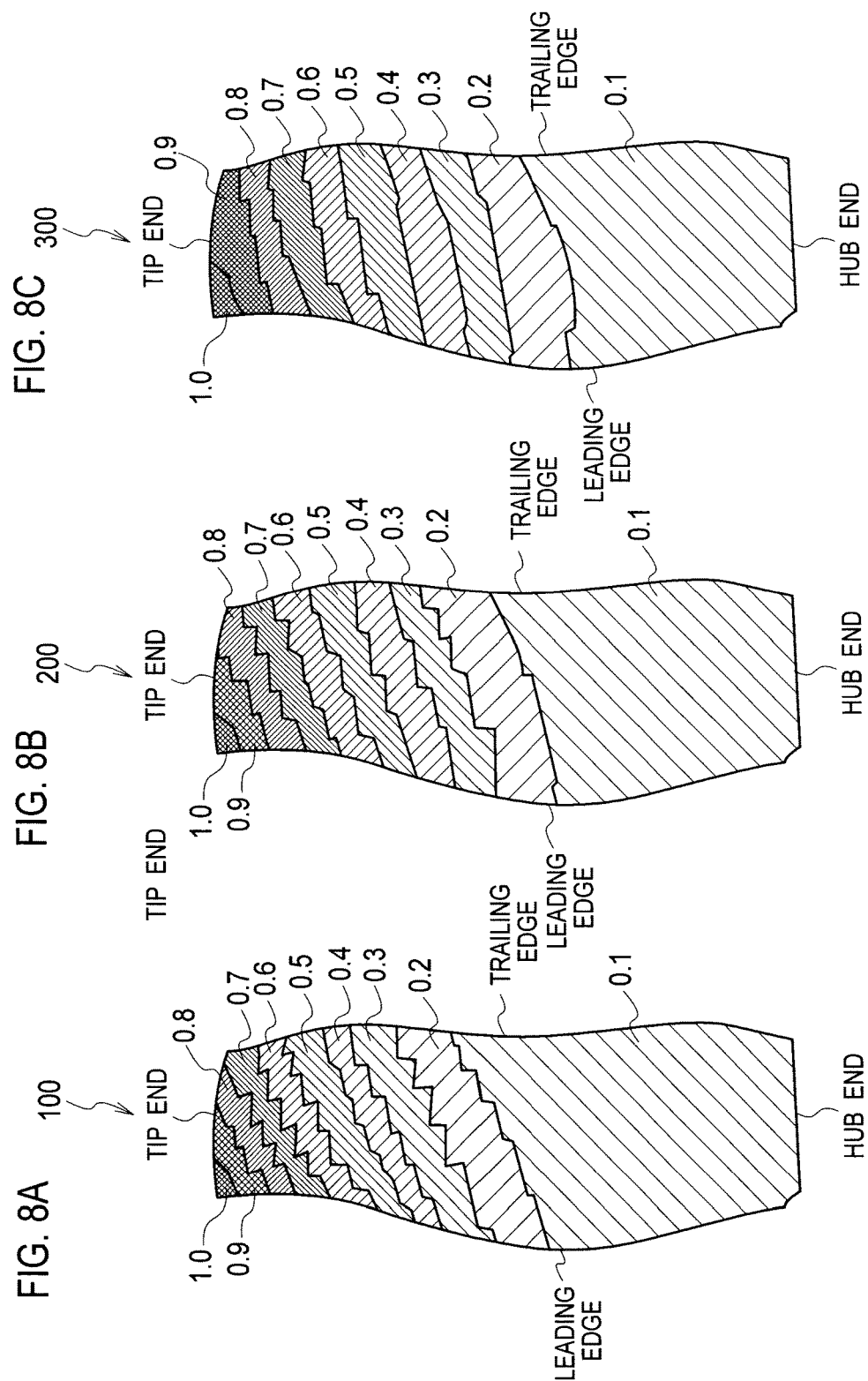

ROTOR BLADE AND FAN

CROSS REFERENCE TO RELATED APPLICATIONS

This application is a continuation application of International Application No. PCT/JP2013/061837 filed on Apr. 23, 2013, which claims priority to Japanese Patent Application No. 2012-104433, filed on May 1, 2012, the entire contents of which are incorporated by references herein.

BACKGROUND OF THE INVENTION

1. Field of the Invention

The present invention relates to a rotor blade and the like used for a fan or a compressor of an aircraft engine.

2. Description of the Related Art

As a light-weight high-strength material, a composite material of fibers and a matrix resin has attracted attention in the field of aircraft engines in recent years. Various developments are underway on fan rotor blades using a composite material of fibers and a matrix resin as a constituent material (see Japanese Patent Application Laid-Open Publication No. 2003-254298). In addition, a rotor blade main body of the fan rotor blade of the related art is formed by stacking composite sheets each made from fibers and a matrix resin, and includes multiple types of composite sheets which are different from one another in terms of an orientation direction of the fibers.

In addition to aforementioned patent literature, Japanese Patent Application Laid-Open Publication No. 2010-203435 and International Publication WO 2009/119830 describe technologies related to the present invention.

SUMMARY OF THE INVENTION

Meanwhile, an increase in rigidity of the fan rotor blade by increasing the thickness and the chord length of the fan rotor blade is needed to suppress twist of the rotor blade main body in the vicinity of the extremity end (in the vicinity of the tip) and to sufficiently secure flutter resistance for the fan rotor blade while the aircraft engine is in operation. On the other hand, the increases in the thickness and the chord length of the fan rotor blade result in an increase in the weight of the fan rotor blade, and accordingly make it difficult to achieve a reduction in the weight of the fan rotor blade. In short, there is a problem that it is not easy to achieve the reduction in the weight of the fan rotor blade and sufficiently secure the flutter resistance for the fan rotor blade at the same time.

It should be noted that the foregoing problem occurs not only in the fan rotor blade using the composite material of the fibers and the matrix resin as the constituent material, but also similarly in a compressor rotor blade using the composite material of the fibers and the matrix resin as the constituent material.

Against this background, the present invention aims to provide a rotor blade and the like which can solve the foregoing problem.

A first aspect of the present invention provides a rotor blade used for any one of a fan and a compressor of an aircraft engine, and using a composite material of fibers and a matrix resin as a constituent material. The rotor blade includes: a rotor blade main body; and a rotor blade root portion formed integrally on a base end side (a hub end side) of the rotor blade main body. Here, the rotor blade main body is formed by stacking a plurality of composite sheets each made from the fibers (a bundle of the fibers) and the matrix resin, and includes a plurality of first composite sheet groups and a plurality of second composite sheet groups which are provided in a blade thickness direction. Each first composite sheet group includes one or a plurality of the composite sheets which are stacked one on another from a blade thickness center side toward a dorsal surface, and which are different from one another in terms of an orientation angle of the fibers. Each second composite sheet group includes one or a plurality of the composite sheets which are stacked one on another from the blade thickness center side toward a ventral surface, and which are different from one another in terms of the orientation angle of the reinforcing fibers. A stacking pattern of the plurality of composite sheets in the first composite sheet group and a stacking pattern of the plurality of composite sheets in the second composite sheet group are the same. Moreover, a composite direction of orientation directions of the reinforcing fibers in the plurality of composite sheets in each of the first composite sheet group and the second composite sheet group (the composite sheet groups) inclines to a trailing edge from a span direction.

In this respect, in the description and scope of claims of the application concerned, the "rotor blade" means both a fan rotor blade used for the fan and a compressor rotor blade used for the compressor. In addition, the "span direction" means a direction extending from the base end side (the hub end side) to an extremity end side (the tip end side) of the rotor blade main body. The "orientation angle" means an angle of inclination of the fibers from the span direction on an acute-angle side. A positive orientation angle represents an inclination to the leading edge of the rotor blade main body, while a negative orientation angle represents an inclination to the trailing edge of the rotor blade main body.

A second aspect of the present invention provides a fan configured to take air into an engine passage formed in an engine case of an aircraft engine. The fan includes: a fan disk provided in the engine case rotatably around an axis of the fan disk, and including a plurality of fitting grooves formed in its outer peripheral surface; and the rotor blade according to the first aspect which is fitted into each fitting groove in the fan disk.

Without increasing the thickness or the chard length of the rotor blade, the present invention can suppress twist of the rotor blade main body in the vicinity of the extremity end while the aircraft engine is in operation. For this reason, the present invention can achieve a reduction in the weight of the rotor blade, and secure sufficient flutter resistance for the rotor blade.

BRIEF DESCRIPTION OF THE DRAWINGS

FIGS. 7A, 7B and 7C are diagrams each for explaining a composite direction of orientation directions of the fibers in the multiple composite sheets in each of the first and second composite sheet groups in corresponding one of rotor blade main bodies as analysis objects, each of which schematically shows the rotor blade main body and the composite sheet group as the analysis object.

FIGS. 8A, 8B and 8C are diagrams respectively showing results of vibration mode analyses on maximum displacements of the rotor blade main bodies in a fan rotation direction while the aircraft engine was in operation.

DESCRIPTION OF THE PREFERRED EMBODIMENTS

Figure 1:
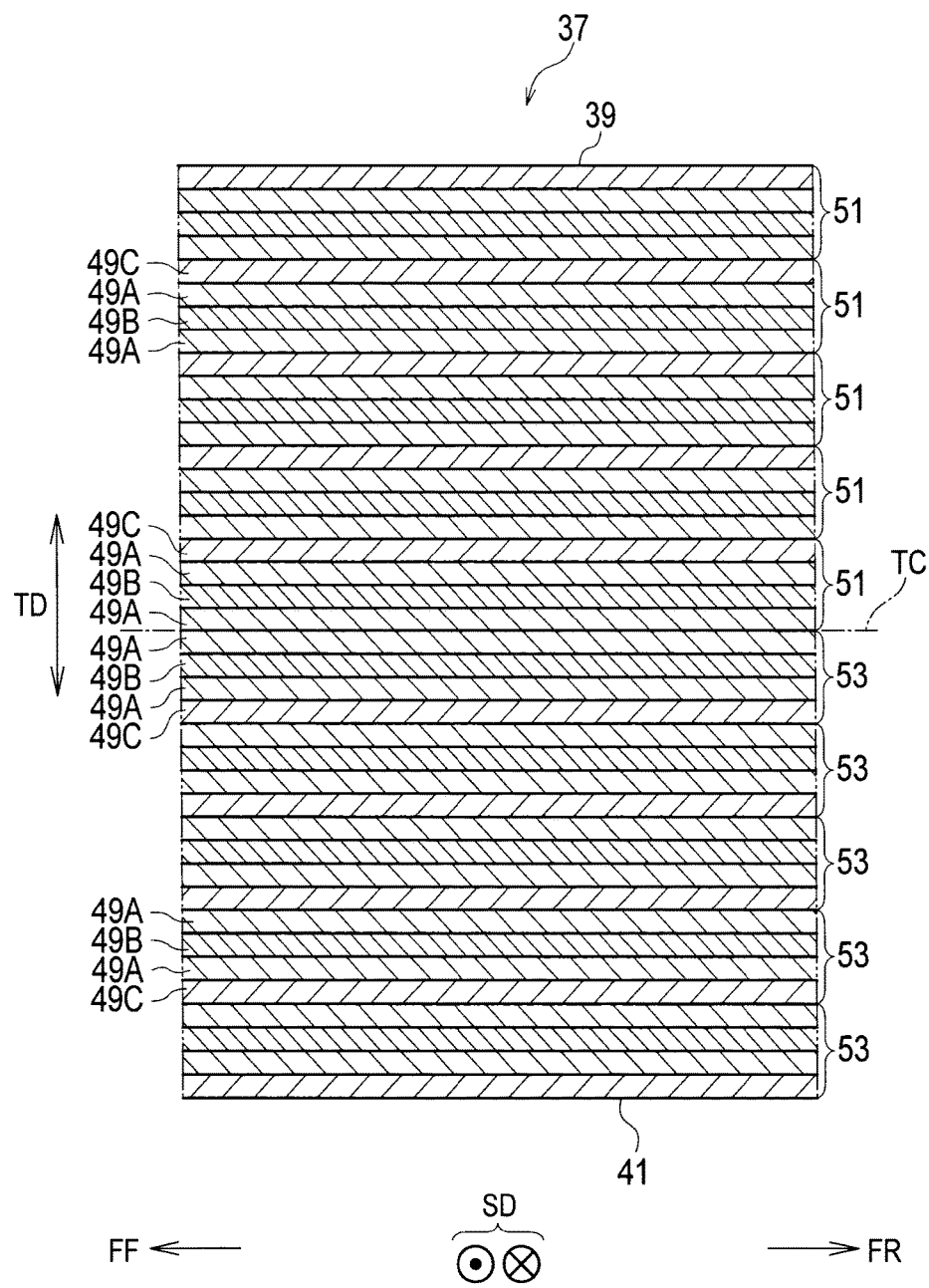
FIG. 1 is a magnified cross-sectional view taken along the I-I line of FIG. 5, in which diagonal lines indicate differences in layers among composite sheets and do not indicate directions of fibers.

The present invention has been made on the basis of the following analysis results. In this analysis, three rotor blade main bodies 100, 200, 300 were used as analysis objects. The rotor blade main bodies 100, 200, 300 each constitute a rotor blade of a fan in an aircraft engine (see a rotor blade main body 37 in FIG. 6).

Each of the rotor blade main bodies 100, 200, 300 includes multiple first composite sheet groups and multiple second composite sheet groups which are provided in its blade thickness direction. Each first composite sheet group includes four composite sheets (prepregs) each made from fibers and a matrix resin. The four composite sheets in the first composite sheet group are stacked one on another from a blade thickness center side toward a dorsal surface on the basis of a predetermined stacking pattern (stacking sequence). In addition, the orientation angles of the fibers in some of the four stacked composite sheets are different from those of the fibers in the rest of the four stacked composite sheets. On the other hand, each second composite sheet group includes four composite sheets (prepregs) each made from fibers and a matrix resin as well. The four composite sheets in the second composite sheet group are stacked one on another from the blade thickness center side toward a ventral surface on the basis of a predetermined stacking pattern. The stacking pattern for the second composite sheet group is the same as that for the first composite sheet group. In addition, the orientation angles of the fibers in some of the four stacked composite sheets are different from those of the fibers in the rest of the four stacked composite sheets, like in the first composite sheet group.

FIGS. 7A, 7B and 7C respectively show the rotor blade main body 100 as a first analysis object, the rotor blade main body 200 as a second analysis object, and the rotor blade main body 300 as a third analysis object. A direction CD in these diagrams denotes a composite direction of orientation directions of the fibers in the multiple composite sheets in each of the composite sheet groups (i.e., the first composite sheet group and the second composite sheet group). As shown in FIG. 7A, the direction CD of the composite sheet group in the rotor blade main body 100 inclines to the leading edge by 45 degrees from a span direction SD. As shown in FIG. 7B, the direction CD of the composite sheet group in the rotor blade main body 200 is parallel to the span direction SD. Furthermore, as shown in FIG. 7C, the direction CD of the composite sheet group in the rotor blade main body 300 inclines to the trailing edge by 45 degrees from the span direction SD. It should be noted that: in each diagram, vector lines respectively represent the orientation directions of the fibers in the four composite sheets; reference signs "S1 to S4" denote the stacking sequence of the composite sheets; reference sign "FF" denotes a forward direction (an upstream direction) or a leading edge side; and reference sign "FR" denotes a rearward direction (a downstream direction) or a trailing edge side.

FIGS. 8A, 8B, 8C respectively show results of vibration mode analyses on maximum displacements in the fan rotation direction of the rotor blade main bodies 100, 200, 300 which vibrated while the aircraft engine was in operation. It should be noted that the numerical values shown in these diagrams respectively represent the maximum displacements of rotor blade main bodies 100, 200, 300 in the fan rotation direction. Incidentally, the maximum displacements are dimensionless.

As for the vicinity of the extremity end (the vicinity of the tip end) of each rotor blade main body, let us focus on the difference between the maximum displacement on the leading edge side and the maximum displacement on the trailing edge side. It is learned that this difference is relatively large in the rotor blade main bodies 100, 200 shown in FIGS. 8A and 8B. This means that twist is more likely to take place in the vicinity of the extremity end. In contrast to this, it is learned that this difference is relatively small in the rotor blade main body 300 shown in FIG. 8C. This means that twist in the vicinity of the extremity end is relatively suppressed. It should be noted that, albeit not illustrated, the same analysis results were obtained for the maximum displacements of the opposite sides of the rotor blade main bodies 100, 200, 300 in the fan rotation direction while the aircraft engine was in operation. Furthermore, the analysis result similar to that of the rotor blade main body 300 was obtained for a case where the composite direction CD of the orientation directions of the fibers in the multiple composite sheets in each composite sheet group inclined to the trailing edge side by 20 degrees from the span direction SD.

It is learned from the foregoing analysis results that: in the case where the predetermined stacking condition is satisfied and the direction CD inclines to the trailing edge side from the span direction SD, the difference between the maximum displacement on the leading edge side and the maximum displacement on the trailing edge side is smaller in the vicinity of the extremity end of the rotor blade main body while the aircraft engine is in operation; and accordingly, the twist in the vicinity of the extremity end of the rotor blade main body can be suppressed. In this respect, the predetermined stacking condition means that the rotor blade main body includes the multiple first composite sheet groups and the multiple second composite sheet groups which are provided in the blade thickness direction. Each first composite sheet group includes the multiple composite sheets which are stacked one on another from the blade thickness center side toward the dorsal surface on the basis of the stacking pattern, and which are different from one another in terms of the orientation angle of the fibers. Similarly, each second composite sheet group includes the multiple composite sheets which are stacked one on another from the blade thickness center side toward the ventral surface on the basis of the stacking pattern, and which are different from one another in terms of the orientation angle of the fibers.

Furthermore, the stacking pattern in the second composite sheet group is the same as the stacking pattern in the first composite sheet group.

Referring to FIGS. 1 to 6, descriptions will be provided for the embodiment of the present invention. It should be noted that in the drawings, reference sign "FF" means a forward direction (an upstream direction) or the leading edge side; and reference sign "FR" means a rearward direction (a downstream direction) or the trailing edge side.

Figure 6:
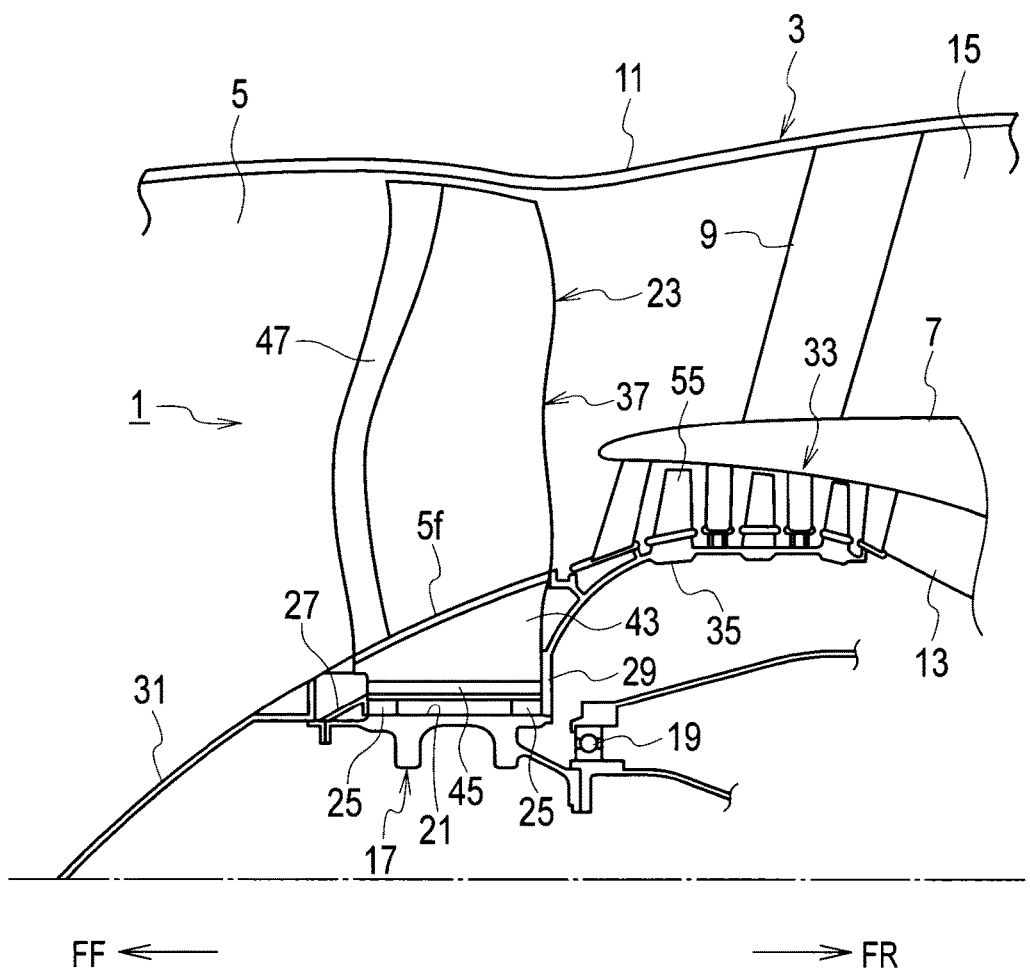
FIG. 6 is a half sectional view of a front part of an aircraft engine of the embodiment of the present invention.

As shown in FIG. 6, a fan 1 of the embodiment is configured to take air into an engine passage 5 formed in an engine case 3 in the aircraft engine. In this respect, the engine case 3 is formed from: a cylindrical core cowl 7; a cylindrical fan case 11 provided in a surrounding manner on the outside of the cylindrical core cowl 7 through multiple struts 9 (only one strut shown in the drawing); and the like. Moreover, the engine passage 5 branches from its midstream into an annular (cylindrical) core passage (main passage) 13 formed inside the core cowl 7, and an annular (cylindrical) bypass passage 15 formed between the inner peripheral surface of the fan case 11 and the outer peripheral surface of the core cowl 7.

A fan disk 17 is rotatably provided to a front portion of the core cowl 7 through a bearing 19 and the like. The fan disk 17 is coaxially and integrally connected to multiple low-pressure turbine rotors (whose illustration is omitted) of a low-pressure turbine (whose illustration is omitted) which is placed in the rear of the fan 1. In addition, multiple fitting grooves (fitting cutouts) 21 are formed in the outer peripheral surface of the fan disk 17 at equal intervals.

Fan rotor blades 23 are fitted into the respective fitting grooves 21 in the fan disk 17. Each fan rotor blade 23 uses a composite material of fibers and a matrix resin as a constituent material. In addition, multiple spacers 25 are provided in the spaces between the bottom surfaces of the fitting grooves 21 in the fan disk 17 and the fan rotor blades 23. Furthermore, an annular front retainer 27 configured to retain the multiple fan rotor blades 23 from the front is integrally provided on the front side of the fan disk 17, while an annular rear retainer 29 configured to retain the multiple fan rotor blades 23 from the rear is integrally provided on the rear side of the fan disk 17. It should be noted that the front retainer 27 is integrally connected to a nose cone 31 configured to guide the air, while the rear retainer 29 is coaxially and integrally connected to a low-pressure compressor rotor 35 in a low-pressure compressor 33 arranged on the rear side of the fan 1.

Accordingly, when the fan disk 17 is rotated by the operation of the aircraft engine, the multiple fan rotor blades 23 are rotated integrally with the fan disk 17. Thereby, the air can be taken into the engine passage 5 (the core passage 13 and the bypass passage 15).

Next, descriptions will be provided for an overall configuration of the fan rotor blade 23 of the embodiment of the present invention.

Figure 5:
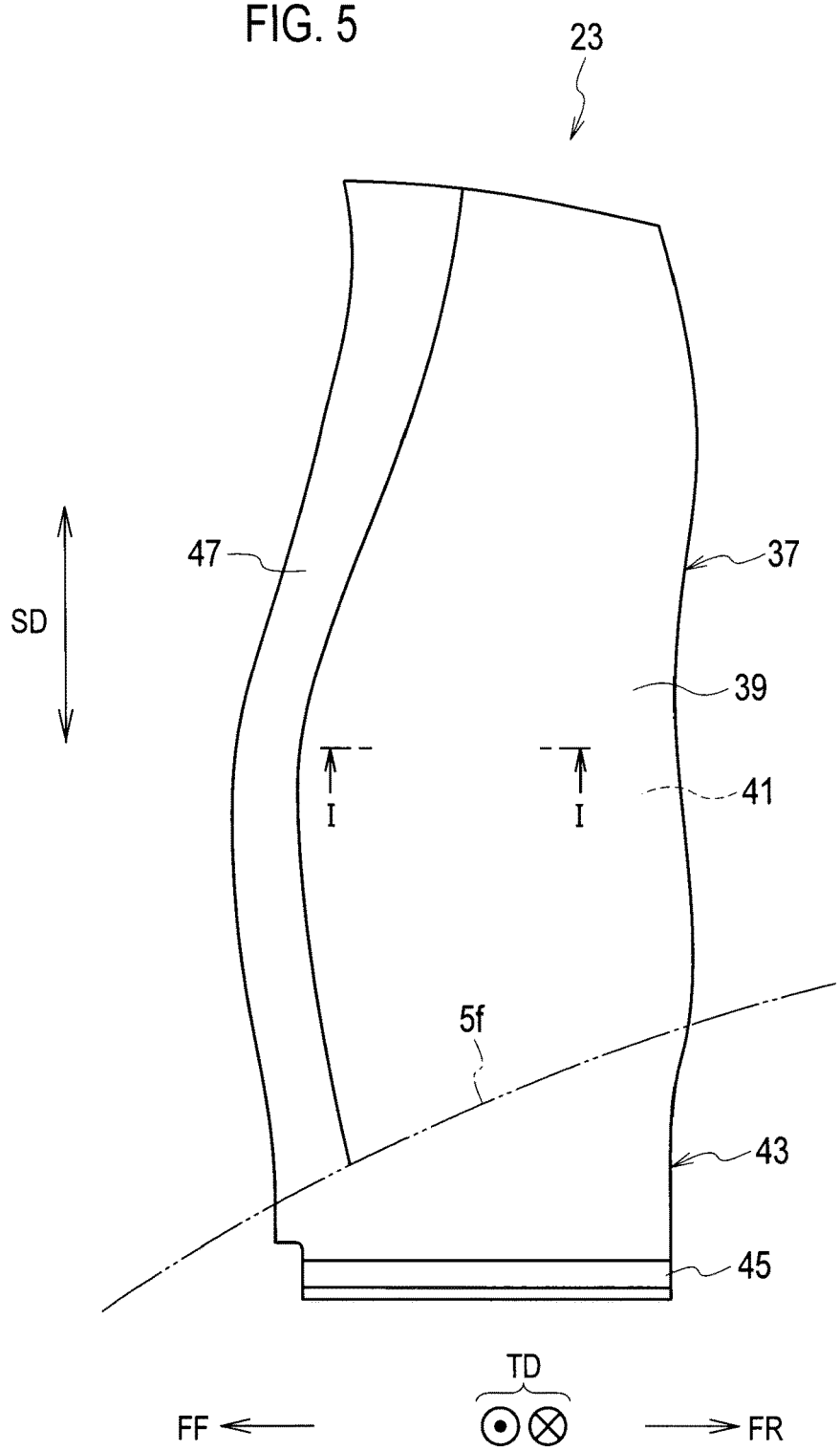
FIG. 5 is a side view of the fan rotor blade of the embodiment of the present invention.

As described above, the fan rotor blade 23 is used in the fan 1. As shown in FIG. 5, the fan rotor blade 23 includes the rotor blade main body 37. The rotor blade main body 37 has a dorsal surface (a suction surface) 39 on one side, and a pressure surface (a ventral surface) 41 on the other side. In addition, the rotor blade main body 37 is made from a composite material of: the fibers of carbon fibers, aramid fibers, glass fibers or the like; and the matrix resin. In this respect, the matrix resin is a thermosetting resin such as epoxy resin, phenol resin or polyimide resin, or a thermoplastic resin such as polyetheretherketone or polyphenylene sulfide.

A rotor blade root portion 43 is integrally formed on a base end side (a hub end side) of the rotor blade main body 37. The rotor blade root portion 43 has a dovetail 45 which is fittable into the fan disk 17. Moreover, like the rotor blade main body 37, the rotor blade root portion 43 is made from the composite material of: the fibers such as carbon fibers, aramid fibers or glass fibers; and the matrix resin. It should be noted that the boundary portion between the rotor blade main body 37 and the rotor blade root portion 43 is located on a passage surface 5f of the engine passage 5.

A sheath 47 configured to protect the leading edge side of the rotor blade main body 37 is provided on the leading edge side of the rotor blade main body 37. The sheath 47 is made from metal such as a titanium alloy.

Next, descriptions will be provided for characteristic features of the fan rotor blade 23 of the embodiment of the present invention.

As shown in FIGS. 1, 2, 4 and 5, the rotor blade main body 37 is formed by stacking composite sheets 49 each made from: the fibers (a bundle of fibers) such as carbon fibers, aramid fibers or glass fibers; and the matrix resin. In this respect, in the embodiment of the present invention, three types of composite sheets 49A, 49B, 49C, which are different from one another in terms of the orientation angle of the fibers, are used as the composite sheets 49. The orientation angle α of the fibers in the composite sheet 49A is set at minus 45 degrees (see FIG. 4A); the orientation angle α of the fibers in the composite sheet 49B is set at 0 degrees (see FIG. 4B); and the orientation angle α of the fibers in the composite sheet 49C is set at minus 90 degrees (see FIG. 4C).

The rotor blade main body 37 includes multiple first composite sheet groups 51 which are provided in the blade thickness direction TD. Each first composite sheet group 51 includes multiple (four, for example) composite sheets 49 (49A, 49B, 49C) which are stacked one on another from a blade thickness center TC side toward a dorsal surface 39. In addition, the rotor blade main body 37 includes multiple second composite sheet groups 53 which are provided in the blade thickness direction TD. Each second composite sheet group 53 includes multiple (four, for example) composite sheets 49 (49A, 49B, 49C) which are stacked one on another from the blade thickness center TC side toward a ventral surface 41. Each of the first composite sheet group 51 and the second composite sheet group 53 includes one or more composite sheets 49 which are different from the other composite sheets 49 in terms of the orientation angle of the fibers. In the embodiment, each of the first composite sheet group 51 and the second composite sheet group 53 is formed from the four composite sheets 49, and includes the three types of composite sheets 49A, 49B, 49C. The stacking pattern (the stacking sequence) for each of the first composite sheet group 51 and the second composite sheet group 53 is set as a sequence in which the composite sheet 49A is sequentially followed by the composite sheet 49B, the composite sheet 49A, and the composite sheet 49C. In other words, the first composite sheet group 51 and the second composite sheet group 53 of the embodiment have the same stacking pattern.

Figure 3:
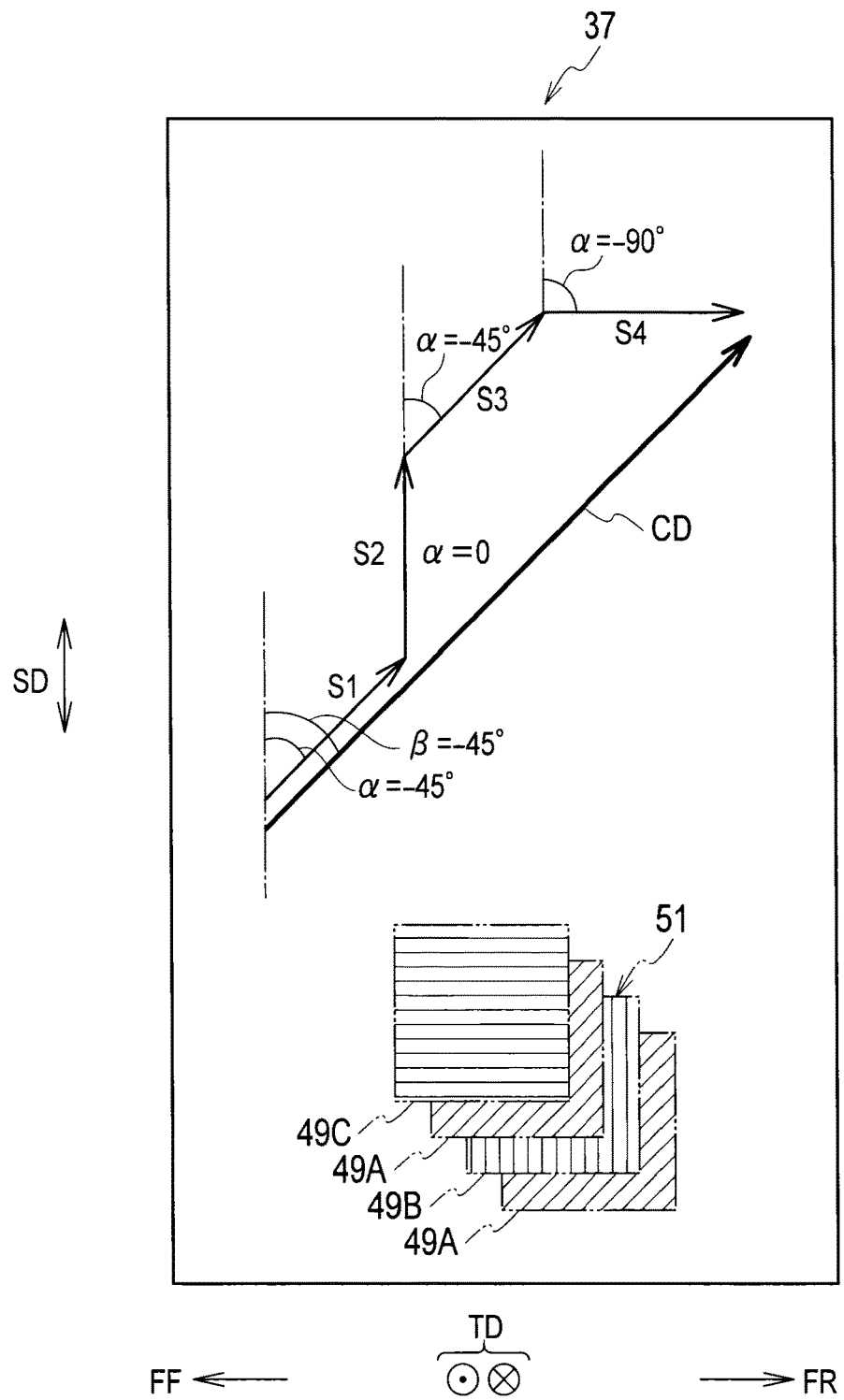
FIG. 3 is a diagram for explaining a composite direction of orientation directions of fibers in multiple composite sheets in each of the first and second composite sheet groups in a fan rotor blade of the embodiment of the present invention, which schematically shows the fan rotor blade and a composite sheet group of the embodiment of the present invention.
Figure 4:
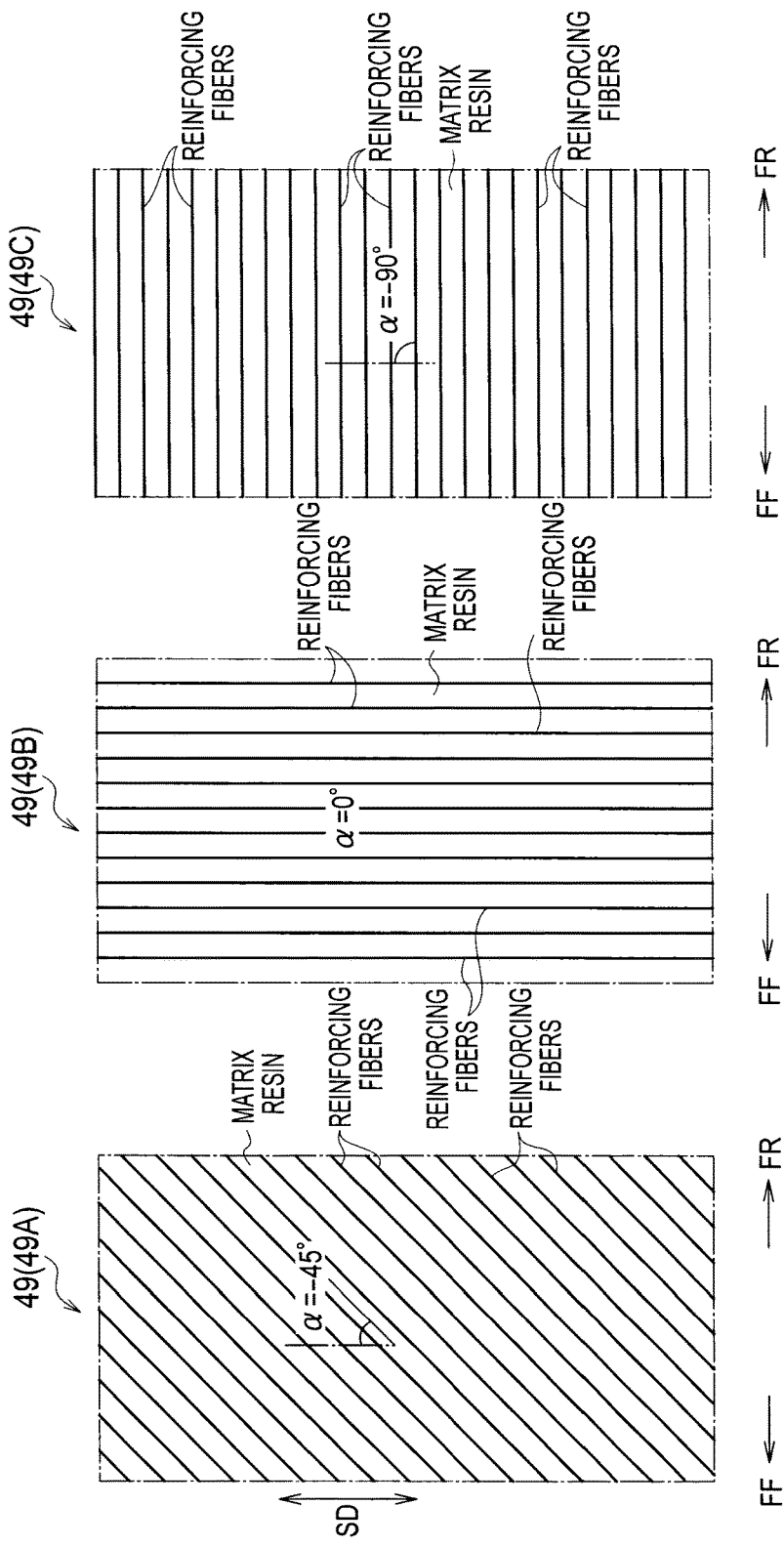
FIG. 4A is a diagram showing a composite sheet in which an orientation angle of fibers is minus 45 degrees.
FIG. 4B is a diagram showing another composite sheet in which an orientation angle of fibers is 0 degrees.
FIG. 4C is a diagram showing still another composite sheet in which an orientation angle of fibers is minus 90 degrees.

As shown in FIG. 3, a composite direction (a composite direction of the fibers) CD of orientation directions of the fibers in the multiple composite sheets 49 in each of the first composite sheet group 51 and the second composite sheet group 53 inclines to the trailing edge by 20 to 45 degrees from the span direction SD. In other words, a composite angle (a composite orientation angle of the fibers) β of orientation angles of the fibers in the multiple composite sheets 49 in each of the first composite sheet group 51 and the second composite sheet group 53 is set at minus 20 degrees to minus 45 degrees. The reason why the composite orientation angle β of the fibers in each of the first composite sheet group 51 and the second composite sheet group 53 is set at not less than minus 20 degrees is that if the composite orientation angle β of the fibers is less than minus 20 degrees, it is difficult to sufficiently suppress twist of the rotor blade main body 37 in the vicinity of its extremity end while the aircraft engine is in operation. On the other hand, the reason why the composite orientation angle β of the fibers in each of the first composite sheet group 51 and the second composite sheet group 53 is set at not greater than minus 45 degrees is that if the composite orientation angle β of the fibers exceeds minus 45 degrees, it is difficult to sufficiently secure rigidity of the rotor blade main body 37.

Figure 2:
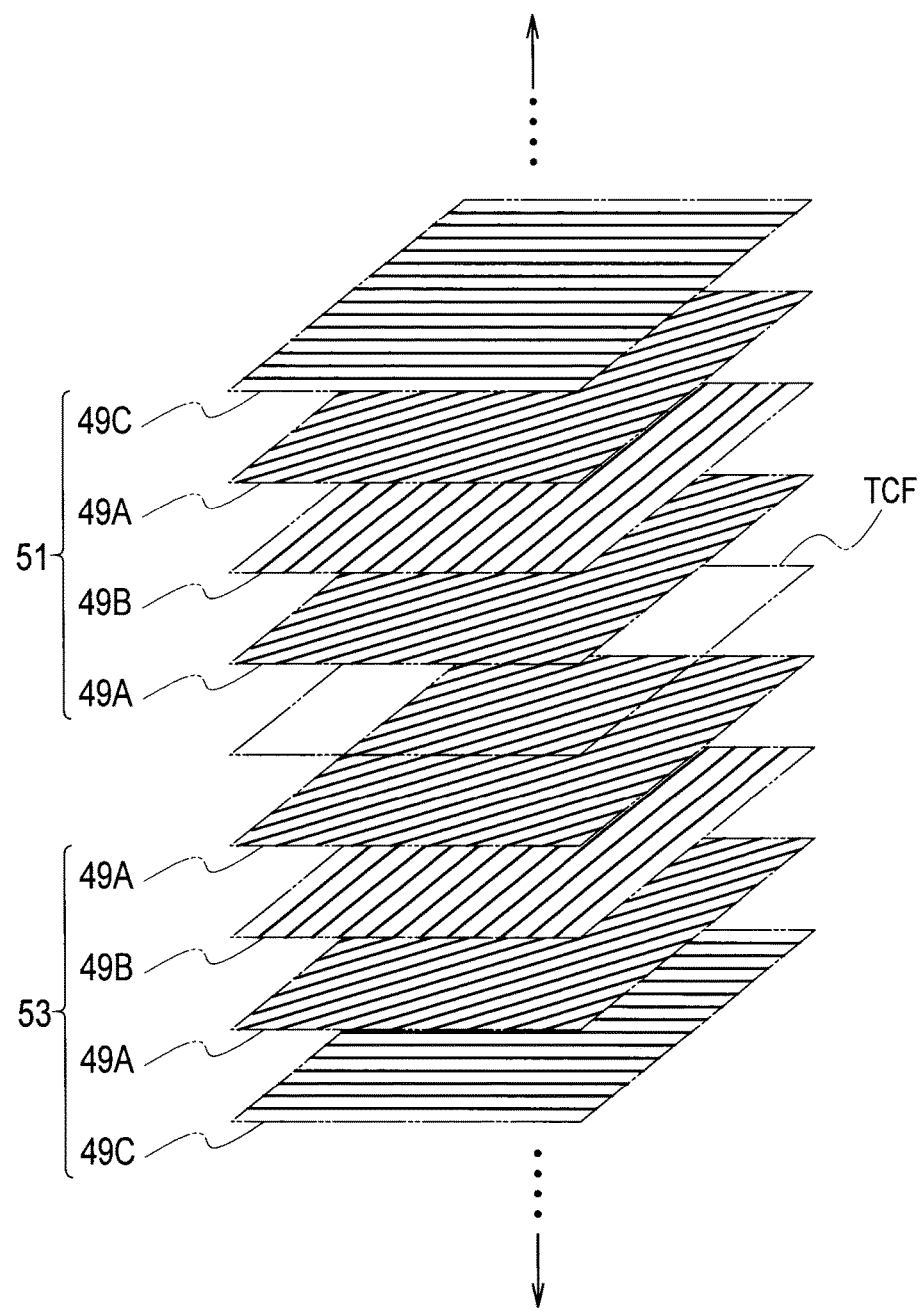
FIG. 2 is a schematic perspective view showing multiple first composite sheet groups and multiple second composite sheet groups.

As shown in FIGS. 1 and 2, the number of first composite sheet groups 51 and the number of second composite sheet groups 53 are equal to each other. In other words, in the rotor blade main body 37, the three types of composite sheets 49A, 49B, 49C which are different from one another in terms of the orientation angle of the fibers are stacked (placed) one on another symmetrically with respect to the blade thickness center IC. Furthermore, an adjustment first composite sheet group (whose illustration is omitted) for adjusting the thickness of the rotor blade main body 37 is locally interposed between any of the adjacent first composite sheet groups 51. Like each first composite sheet group 51, the adjustment first composite sheet group is formed by stacking the composite sheets 49 from the blade thickness center TC side toward the dorsal surface 39 on the basis of the stacking pattern. Moreover, an adjustment second composite sheet group (whose illustration is omitted) for adjusting the thickness of the rotor blade main body is locally interposed between any of the adjacent second composite sheet groups 53. Like each second composite sheet group 53, the adjustment second composite sheet group is formed by stacking the composite sheets 49 from the blade thickness center TC side toward the dorsal surface 41 on the basis of the stacking pattern. It should be noted that another composite sheet (whose illustration is omitted) may be interposed between the first composite sheet group 51 located closest to the blade thickness center TC and the second composite sheet groups 53 located closest to the blade thickness center IC. Incidentally, reference sign "TCF" in FIG. 2 denotes a blade thickness center plane including the blade thickness center TC.

Next, descriptions will be provided for the operation and effect of the embodiment of the present invention.

As described above, the rotor blade main body 37 satisfies the above-mentioned predetermined stacking condition . On top of the satisfaction of the predetermined stacking condition, the composite direction CD of the fibers in the multiple composite sheets 49 in each of the first composite sheet group 51 and the second composite sheet group 53 inclines to the trailing edge by 20 degrees to 45 degrees from the span direction SD. For this reason, as learned from the foregoing analysis results, the difference between the maximum displacement on the leading edge side and the maximum displacement on the trailing edge side becomes smaller in the vicinity of the extremity end of the rotor blade main body 37 while the aircraft engine is in operation. As a consequence, it is possible to suppress the twist of the rotor blade main body 37 at the vicinity of the extremity end. In other words, without increasing the thickness or the chord length of the fan rotor blade 23, it is possible to sufficiently secure the rigidity of the rotor blade main body 37, and additionally to suppress the twist of the rotor blade main body 37 at the vicinity of the extremity end while the aircraft engine is in operation.

Accordingly, the embodiment makes it possible to achieve the reduction in the weight of the rotor blade, and to sufficiently secure the flutter resistance for the rotor blade.

What is more, the construction of the fan of the aircraft engine using the rotor blades of the embodiment brings about the foregoing effect, and additionally makes it possible to take the air into the engine case by: rotating the fan disk through the operation of the aircraft engine; and thereby rotating the multiple fan rotor blades integrally with the fan disk.

The present invention is not limited to what has been described for the foregoing embodiment, and can be carried out in various modes as follows, for example.

To put it specifically, the number of composite sheets 49 may be changed in each first composite sheet group 51 and each second composite sheet group 53. The number of first composite sheets groups 51 and the number of second composite sheet groups 53 may be different from each other. The stacking pattern of the multiple composite sheets 49 may be changed in each first composite sheet group 51 and each second composite sheet group 53. The orientation angle of the fibers may be changed in each of the multiple composite sheets 49A, 49B, 49C. The configuration of the present invention applied to the fan rotor blade 23 may be applied to the low-pressure compressor blade 55 in the low-pressure compressor rotor 35 (see FIG. 5).

It should be noted that the scope of rights covered by the present invention is not limited to these embodiments.

What is claimed is:

1. A rotor blade used for any one of a fan and a compressor of an aircraft engine, and using a composite material of fibers and a matrix resin as a constituent material, the rotor blade comprising:

a rotor blade main body provided with a ventral surface and a dorsal surface; and a rotor blade root portion formed integrally on a base end side of the rotor blade main body;

wherein the rotor blade main body is formed by stacking a plurality of composite sheets each made from the fibers and the matrix resin, and includes a plurality of first composite sheet groups and a plurality of second composite sheet groups which are provided in a blade thickness direction;

wherein the plurality of first composite sheet groups and the plurality of second composite sheet groups are provided on mutually opposite sides with respect to a reference plane between two of the composite sheets stacked on one another;

wherein each first composite sheet group includes a plurality of the composite sheets which are stacked one on another from the reference plane toward the dorsal surface, and which are different from one another in terms of an orientation angle of the fibers;

wherein each second composite sheet group includes a plurality of the composite sheets which are stacked one on another from the reference plane toward the ventral surface, and which are different from one another in terms of the orientation angle of the fibers;

wherein a stacking pattern of the plurality of composite sheets in the first composite sheet group from the reference plane toward the dorsal surface and a stacking pattern of the plurality of composite sheets in the second composite sheet group from the reference plane toward the ventral surface are the same;

wherein a composite direction of orientation directions of the fibers in the plurality of composite sheets in each of the first composite sheet group and the second composite sheet group inclines to a trailing edge from a span direction; and wherein the composite direction in each of the first composite sheet group and the second composite sheet group inclines to the trailing edge by 20 degrees to 45 degrees from the span direction.

2. A fan configured to take air into an engine passage formed in an engine case of an aircraft engine, the fan comprising:

a fan disk provided in the engine case rotatably around an axis of the fan disk, and including a plurality of fitting grooves formed in an outer peripheral surface of the fan disk; and a rotor blade according to claim 1, fitted into each fitting groove in the fan disk.

3. The rotor blade according to claim 1, wherein each of the plurality of composite sheets in the first composite sheet group and the second composite sheet group is formed from four composite sheets of three types of composite sheets with different orientation angles of the fiber, the first type of composite sheet having an orientation angle of minus 45 degrees, the second type of composite sheet having an orientation angle of 0 degrees, and the third type of composite sheet having an orientation angle of minus 90 degrees.

4. The rotor blade according to claim 3, wherein the stacking pattern of the plurality of composite sheets in the first composite sheet group and the stacking pattern of the plurality of composite sheets in the second composite sheet group is the first type of composite sheet, sequentially followed by the second type of composite sheet, the first type of composite sheet, and the third type of composite sheet.

5. The rotor blade according to claim 1, wherein the plurality of composite sheets in each sheet composite group are stacked on one another symmetrically with respect to a blade thickness center of the rotor blade main body as the reference plane.

6. The rotor blade according to claim 1, wherein the reference plane is a blade thickness center plane between the ventral surface and the dorsal surface of the rotor blade main body.

* * * * *